Aug. 22, 1950     S. S. LIPPINCOTT     2,520,089
ORIFICE PLATE
Filed April 11, 1946
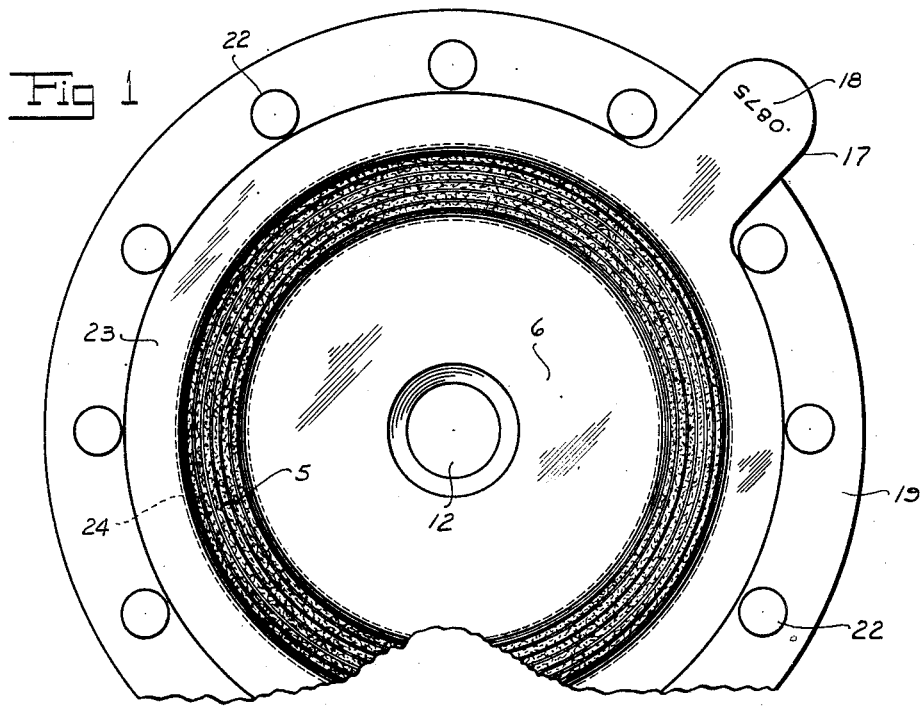
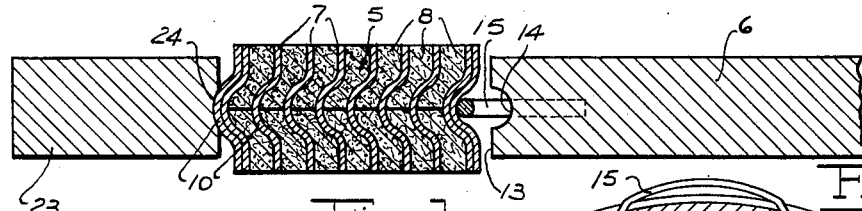
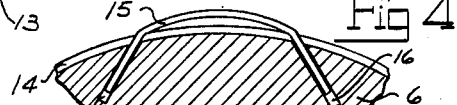
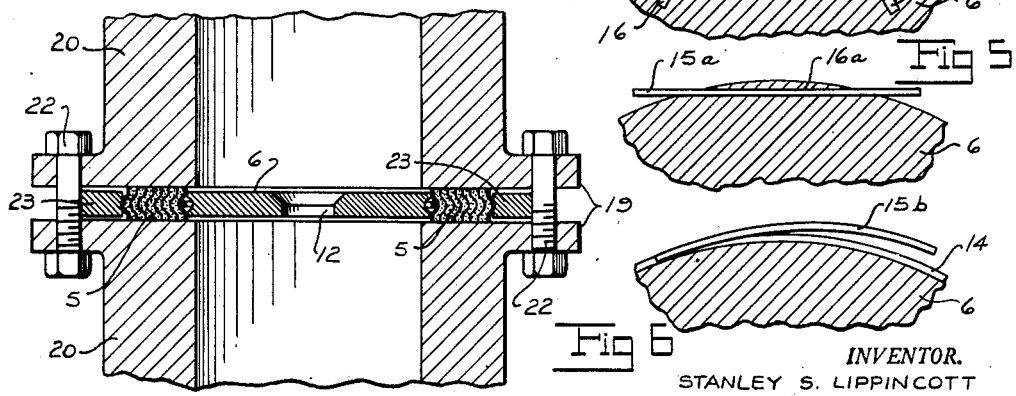
INVENTOR.
STANLEY S. LIPPINCOTT
BY *[signature]*
Atty.

Patented Aug. 22, 1950

2,520,089

UNITED STATES PATENT OFFICE 2,520,089

ORIFICE PLATE

Stanley S. Lippincott, Palmyra, N. J., assignor to Flexitallic Gasket Company, Camden, N. J., a corporation of New Jersey Application April 11, 1946, Serial No. 661,460

6 Claims. (Cl. 138—40)

This invention relates to metering orifice plates and has for its object to provide a novel and improved means for mounting such plates in pipe flange junctures or the like.

Another object of the invention is to reduce the number of possible points of leakage between an orifice plate and the pipe joint in which it is mounted.

Another object is to simplify the installation and removal of orifice plates and thereby also simplify the construction and assembly of the joints in which they are mounted.

Still another object is to provide a combination gasket and metering orifice plate which may be installed as a unit and is readily assembled and disassembled to effect a change either in the gasket or in the calibration of the orifice plate.

Various other objects and advantages will be apparent as the nature of the invention is more fully disclosed.

The usual method of installing metering orifice plates in pipe joints is to sandwich the orifice plate between two gaskets and clamp such assembly between two flanged pipe sections. One disadvantage of this mounting is that it creates four areas in the joint where leakage can occur, there being two possible areas of leakage for each gasket. Another disadvantage is the awkwardness of handling and assembling the joints and the difficulty of properly centering the orifice plate and gaskets where this type of mounting is employed.

The present invention provides a novel combination of gasket and metering orifice plate which avoids the foregoing disadvantages of the prior art and embodies a number of special advantages in simplicity of construction and assembly, resistance to radial strains, and general efficiency in operation not heretofore obtainable in devices of this type.

My composite structure comprises a compressible annular gasket containing within its inner annulus an orifice plate having resilient means securing same to the gasket. In the preferred embodiment, hereinafter more fully described, the gasket is formed of spirally wound strip metal having a longitudinal bead and a metallic or a non-metallic packing interposed between the spiral convolutions, while the orifice plate comprises a flat disc seated within the inner annulus of the gasket and containing a peripheral groove from which springs project outwardly into the surrounding groove formed by the bead of the gasket to secure the two component members in a compact unitary structure. A positioning ring may be secured around the outer periphery of the gasket to aid in centering the same and to carry a designation of the orifice size in an accessible position. The composite gasket, orifice plate and positioning ring may be readily interposed between pipe sections in any metering orifice location with minimum labor and maximum assurance against leakage.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

In the drawing:

Fig. 1 is a broken plan view of a composite gasket, metering orifice plate and positioning ring embodying the present invention;

Fig. 2 is a fragmentary radial section, on an enlarged scale, of the gasket and orifice plate;

Fig. 3 is a fragmentary sectional view of a pipe flange juncture with an interposed orifice plate; and Figs. 4 to 6 are detail views showing different forms of spring means for securing the orifice plate to the gasket.

In the following description certain specific terms are used for convenience in referring to the various details of the invention. These terms, however, are to be interpreted as broadly as the state of the art will permit.

Referring to the drawings, a compressible gasket 5 is shown which may be of the type disclosed in Patent No. 1,829,709, to H. Bohmer, Jr., issued October 27, 1931, and comprises a spirally wound strip of metal 7 having a strip 8 of packing material such as asbestos or soft metal interposed between the convolutions of the spiral. Prior to winding, the metallic strip 7 is fashioned lengthwise thereof to provide a central, longitudinal, hollow rib or bead 10, as shown in Fig. 2. The packing 8 may be omitted between certain successive convolutions of the metallic strip 7 and the latter brought into contact and secured to one another so as to form closed multiple reinforcing bands as described in the above mentioned patent.

A flat circular orifice plate or disc 6 having a central metering orifice 12 is provided on its outer peripheral edge 13 with a shallow circumferential groove 14. Within the groove 14 are mounted a plurality of wire springs 15. In the form shown in Fig. 4 the springs 15 have their ends seated in spaced holes 16 which are formed in the plate. The springs 15 are preferably three or four in number and are equally spaced about the periphery of the plate 6 so as to center the orifice plate within the gasket.

In the form of Fig. 5 the wire 15a extends through a hole 16a in the periphery of the orifice plate 6 with its ends protruding to provide the resilient securing means.

In the form of Fig. 6 the spring 15b is shown as attached at one end to the periphery of the orifice plate as by welding.

In any of the above forms the orifice plate 6 is seated within the annulus of the gasket 5 and the bowed springs are sprung into the hollow of the rib 10 in the surrounding metal strip 7, thus centering and securing the orifice plate in the gasket as a composite unitary structure.

The groove 14 is of a size to receive the spring wires when the latter are depressed to provide clearance for inserting the plate 6 within the gasket.

A positioning ring 23 is secured around the outer periphery of the gasket 5. This ring 23 is provided with a groove 24 around its inner periphery in which the bead 10 of the ribbon 7 is seated for securing the gasket in the ring 23. The ring 23 preferably has an outer diameter such as to fit within the circle of the bolts 22 to be described and is provided with a tongue 17 which extends outwardly between the bolts 22 to form a positioning handle. The tongue 17 may carry a designation 18 of the orifice size.

Fig. 3 shows my composite gasket and metering orifice plate interposed between the flange 19 of aligned pipe sections 20, which are drawn together by bolts 22 into firm compressive contact with the gasket. The orifice plate 6 and ring 23 are shown as somewhat thinner than the gasket 5 and are selected to provide a compression gauge. For example, the gasket is held under proper sealing pressure when the flanges 19 are drawn down to a specified clearance with the ring 23, or in some cases to the ring itself. This sealing pressure causes the gasket to expand radially into close peripheral contact with the orifice plate and thus eliminates leakage therebetween. The gasket forms an effective seal between the pipe sections and offers great resistance to crushing and to radial strains.

Since my composite gasket, orifice plate and positioning ring is a single unit, requiring no separate gaskets or washers, it affords a simple and practical means of installation with a minimum of labor and complete assurance that by properly centering the ring 23 between the bolts 22 the orifice plate 6 will be properly located and retained in position. The device may also be easily removed to effect either a change in the gasket or calibration of the orifice.

The invention also accomplishes the above stated object of reducing the number of possible points of leakage between the orifice plate and the pipe coupling in which it is used, since in my device the only two possible points of leakage are the surfaces where the gasket engages the two pipe sections.

Although a specific embodiment has been shown and described herein for purposes of illustration, it will be evident to those skilled in the art that the invention is capable of various modifications and adaptations within the scope of the appended claims.

What is claimed is:

1. The combination with a compressible annular gasket having an annular groove on its inner periphery, of an orifice plate comprising a solid disc seated within the inner annulus of said gasket and having a metering orifice therein, the peripheral edge of said disc containing a circumferential groove, and resilient means in said groove projecting outwardly beyond the peripheral edge of said disc and engaged in the surrounding annular groove of said gasket.

2. The combination with a compressible annular gasket having an annular groove on its inner periphery, of an orifice plate comprising a solid disc seated within the inner annulus of said gasket and having a metering orifice therein, the peripheral edge of said disc containing a circumferential groove, and a plurality of bowed springs in said groove projecting beyond the peripheral edge of said disc and engaged in the surrounding groove of said gasket.

3. The combination with a compressible annular gasket formed of spirally wound strip material having a longitudinal bead, said bead forming an annular peripheral groove on the inner periphery of said gasket, of an orifice plate comprising a solid disc seated within the inner annulus of said gasket and having a metering orifice therein, the peripheral edge of said disc containing a circumferential groove, and a plurality of bowed springs in said groove projecting beyond the peripheral edge of said disc and engaged in the surrounding groove of said gasket.

4. The combination with a compressible annular gasket formed of spirally wound strip material having a longitudinal bead, said bead forming an annular peripheral groove on the inner periphery of said gasket, of an orifice plate comprising a solid disc seated within the inner annulus of said gasket and having a metering orifice therein, the peripheral edge of said disc containing a circumferential groove and pairs of slots extending into said disc from said groove, and a plurality of bowed wire springs in said groove having their ends seated in said slots and their bowed portions projecting beyond the peripheral edge of said disc and engaged in the surrounding groove of said gasket.

5. The combination with a compressible annular gasket formed of spirally wound strip metal having a longitudinal bead forming a groove in the inner periphery of the gasket and a bead on its outer periphery and a packing interposed between the spiral convolutions, of an orifice plate comprising a flat solid disc seated within the inner annulus of said gasket and having a metering orifice therein, the peripheral edge of said disc containing a shallow circumferential groove, spring means receivable in the groove of said orifice plate to seat in the groove of said gasket for securing said orifice plate in position, and a positioning ring around the outer periphery of said gasket having an internal groove receiving the outer bead of said gasket for securing the same, said positioning ring and orifice plate being thinner than said gasket and selected to limit the compression of said gasket, said positioning ring having an outer diameter suited to center said orifice plate.

6. The combination with a compressible annular gasket formed of spirally wound strip metal having a longitudinal bead forming a groove in the inner periphery of the gasket and a bead on its outer periphery and a packing interposed between the spiral convolutions, of an orifice plate comprising a flat solid disc seated within the inner annulus of said gasket and having a metering orifice therein, the peripheral edge of said disc containing a shallow circumferential groove, springs means receivable in the groove of said orifice plate to seat in the groove of said gasket for securing said orifice plate in position, a positioning ring around the outer periphery of said gasket having an internal groove receiving the outer bead of said gasket for securing the same, said positioning ring and orifice plate being thinner than said gasket and selected to limit the compression of said gasket, said positioning ring having an outer diameter suited to center said orifice plate, and a tongue projecting outwardly from said positioning ring to serve as a handle and to carry a designation of the orifice size.

STANLEY S. LIPPINCOTT.

REFERENCES CITED

The following references are of record in the file of this patent:

UNITED STATES PATENTS

| Number | Name | Date |
|---|---|---|
| 1,869,577 | Oberhuber | Aug. 2, 1932 |
| 2,196,953 | Bohmer et al. | Apr. 9, 1940 |
| 2,339,478 | Hoheisel | Jan. 18, 1944 |
| 2,339,479 | McCreary | Jan. 18, 1944 |
| 2,407,951 | Daniel | Sept. 17, 1946 |